Figure 1:
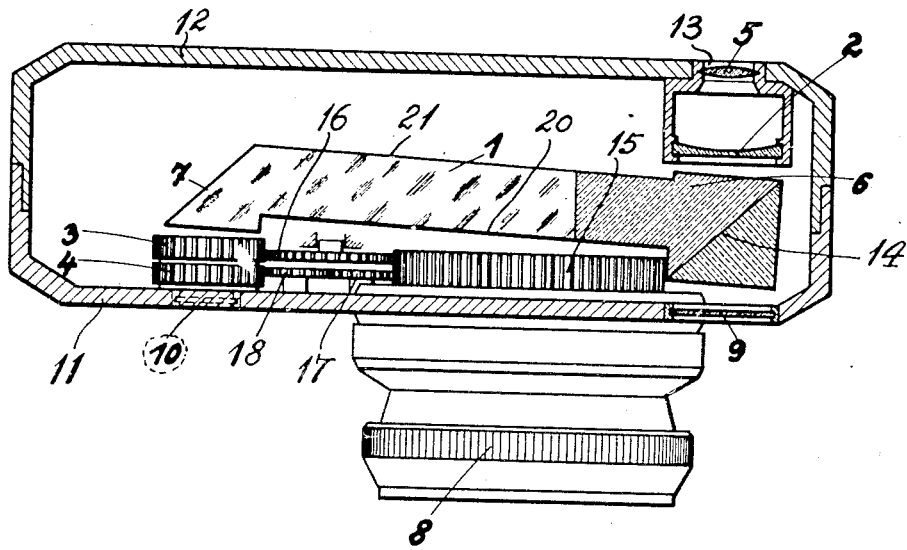

Feb. 14, 1939.　　　H. KÜPPENBENDER　　　2,147,259

ROLL-FILM CAMERA

Filed Dec. 24, 1937

Inventor
Heinz Küppenbender
by B. Singer
Attorney

Patented Feb. 14, 1939

2,147,259

UNITED STATES PATENT OFFICE 2,147,259

ROLL-FILM CAMERA

Heinz Küppenbender, Dresden, Germany, assignor to Zeiss Ikon Aktiengesellschaft, Dresden, Germany Application December 24, 1937, Serial No. 181,576
In Germany January 27, 1937

6 Claims. (Cl. 95—44)

The invention relates to improvements in roll film cameras and in particular is directed to roll film cameras provided with an inbuilt range finder of the mirror base type.

In cameras of the type referred to and especially in miniature cameras it is sometimes difficult to properly install the mirror base of the range finder in the camera casing. On one hand it is desirable to keep the size of the camera casing as small as possible, while on the other hand the image producing means of the camera and the arrangement of the ray deflecting means in the camera casing demand an additional space for the range finder if the customary mirror base is to be employed. When mounting the prism bar, which forms the mirror base of the range finder, in the camera casing care has to be observed that the picture angle of the optical means coinciding with the finder means corresponds to the picture angle of the camera objective. This requires sometimes a predetermined size of that end portion of the prism bar adjacent the view opening. Furthermore, the other end of the prism bar has to be spaced a sufficient distance away from the front wall of the camera to permit the arrangement of any ray deflecting means in this space including space for mechanical operating means as gears or the like for adjusting the ray deflecting means.

It is now an object of the invention to mount the prism bar of a mirror base type range finder in such a position in the camera casing that the above conditions are completely fulfilled.

Another object of the invention is to arrange the ray admitting opening for the ray passing through the ray deflecting means and then through the prism bar as close as possible to the axis of the camera objective for reducing the parallax of the range finder.

Still another object of the invention is to arrange the other ray admitting opening of the range finder, which opening is in axial alinement with the viewing opening, sufficiently high with respect to the camera objective that the finder area, which usually is larger than the image area of the range finder, remains unobstructed.

These and other objects of the invention as will appear hereinafter are obtained by mounting the prism bar, constituting the mirror base of the range finder, in such a manner in the camera casing that its longitudinal axis is positioned at an angle with respect to a number of walls or all walls of the camera casing.

The drawing illustrates by way of example one embodiment of the invention.

Figure 2:
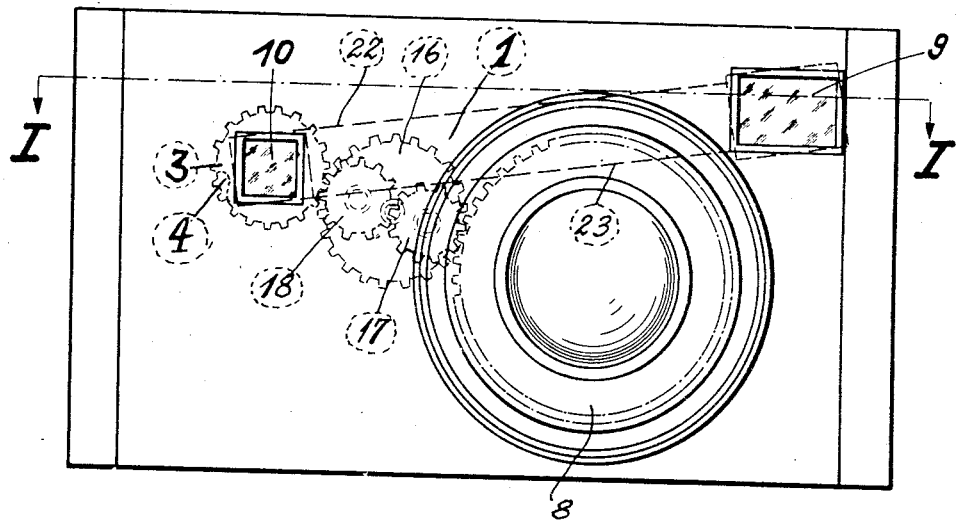

Fig. 1 is a horizontal sectional view of a roll film camera substantially along the line I—I of Fig. 2, and Fig. 2 is a front elevation view of the camera which illustrates in particular the novel placement of the ray admitting openings of the range finder.

The drawing illustrates only those parts of the camera which are necessary for the understanding of the present invention. The casing of the roll film camera has a front wall 11 and a rear wall 12, the former has attached thereto the adjustable camera objective 8, while the rear wall 12 is provided with an aperture 13 in which an eye lens 5 is mounted. A short distance away from the eye lens 5, in axial alinement therewith and within the camera casing, is mounted in any suitable manner a finder lens 2. The front wall 11 of the camera casing is provided in axial alinement with the lenses 5 and 2 with an opening 20 closed by a transparent glass plate 9. In the space between the finder lens 2 and the glass plate 9 is positioned one end or the so-called "head" 6 of the prism bar 1 of the range finder. This head 6 in the illustrated embodiment is somewhat larger than the main body portion of the prism bar 1. This is due to the fact that the form and size of the head 6 has to be constructed to correspond with the picture angle of the camera objective 8.

The prism bar 1 has a rectangular cross-section and its other end is provided, as is customary in range finders of this type, with an oblique reflecting surface 7. This reflecting surface 7 is adapted to reflect the measuring rays passing through another opening in the front wall 11 of the camera casing toward the oblique and semi-transparent reflecting surface 14 in the head 6 of the prism bar 1. This last mentioned opening is likewise closed by a transparent glass plate designated with 10.

The end of the prism bar 1 provided with the reflecting surface 7 is spaced a sufficient distance away from the front wall 11 of the camera casing to permit the mounting of any suitable ray reflecting means between this end of the prism bar 1 and the glass plate 10.

In the present instance a pair of axially alined annular gears 3, 4 is interposed between the reflecting face 7 and the glass plate 10. Each annular gear 3, 4 forms the mounting for an optical wedge, which are fixedly secured in the bore of their respective annular gear to rotate with the same. These gears 3 and 4 and the optical wedges carried by the same are simultaneously rotated in opposite direction by the camera objective 8 when the latter during the focusing operation is rotatably adjusted. For this purpose, the rotatable member of the camera objective 8 is provided at a portion extending into the interior of the camera casing with a gear 15 meshing simultaneously with two gears 16 and 17. The gear 16 in turn meshes with the annular gear 3, while the gear 17 meshes with a gear 18 which also meshes with the annular gear 4. It will thus be apparent that upon rotation rotatably adjusting or focusing the objective lens 8 the gear 15 will cause a rotation of the annular gears 3, 4 or the pair of rotary wedges simultaneously in opposite direction, thereby effecting an adjustment of the range finder simultaneously with the focusing of the camera objective.

Heretofore it was customary to mount the prism bar forming the mirror base of the range finder horizontally within the camera casing and with its longitudinal axis or side faces parallel with respect to the front and rear wall of the same. The present invention, however, contemplates a much better utilization of the space available within the camera casing and makes it possible that not only the size of the casing can be reduced, but also that the operation of the range finder as far as the parallax effect is concerned, is improved.

With particular reference to drawing it will be noted, that the prism bar 1 is mounted in an inclined position within the camera casing, not only with respect to a vertical plane but also with respect to a horizontal plane. The longitudinal side faces 20 and 21 (Fig. 1) of the prism bar 1, which are parallel to each other, are positioned at an angle with respect the front and rear wall of the camera casing, and also the parallel longitudinal top and bottom faces 22 and 23 (Fig. 2) of the prism bar 1 are positioned at an angle with respect to the top and bottom wall of the camera casing. The maximum inclination of the prism bar 1 with respect to the horizontal is limited by the conditions that upon arranging the ray deflecting means as close as possible to the camera objective 8 the bar 1 must remain just outside the beam of light passing through the camera objective, and that the opening which also serves as finder and is closed by the transparent glass plate 9 must remain completely unobstructed.

What I claim as my invention is:

1. In combination, a photographic camera having a camera casing provided with parallel front and rear walls and parallel top and bottom walls, a photographic objective on said front wall, and a range finder of the mirror base type mounted within said camera casing, the front wall of said camera casing being provided with two laterally spaced openings located at different levels and on opposite sides of a vertical plane passing through the optical axis of said objective, said range finder including a prism bar forming the mirror base of the range finder, said prism bar being mounted just outside the beam of light passing through said camera objective and its longitudinal axis forming an angle of less than 90° with respect to the said camera walls so as to position one end of said prism bar near said front wall in alinement with one of said two openings and the other end at a greater distance behind said front wall in alinement with the other opening, adjustable ray deflecting means mounted between said last named end of said prism bar and said front wall in axial alinement with said last named opening, and means in the rear wall of said camera casing for observing the images appearing in said range finder, which images are adapted to be brought into registration by adjusting said ray deflecting means.

2. In combination, a photographic camera having a camera casing provided with parallel front and rear walls and parallel top and bottom walls, a photographic objective on said front wall, and a range finder of the mirror base type mounted within said camera casing, the front wall of said camera casing being provided with two laterally spaced openings located at different levels and on opposite sides of a vertical plane passing through the optical axis of said objective, said range finder including a prism bar forming the mirror base of the range finder, said prism bar being mounted just outside the beam of light passing through said camera objective and its longitudinal axis forming an angle of less than 90° with respect to the said camera walls so as to position one end of said prism bar near said front wall in alinement with the higher one of said two openings and the other end at a greater distance behind said front wall in alinement with the lower opening, adjustable ray deflecting means mounted between said last named end of said prism bar and said front wall in axial alinement with said lower opening, and means in said rear wall of said camera casing and in axial alinement with said higher opening in said front wall for observing the images appearing in said range finder.

3. In combination, a photographic camera having a camera casing provided with parallel front and rear walls and parallel top and bottom walls, a photographic objective on said front wall, and a range finder of the mirror base type mounted within said camera casing, the front wall of said camera casing being provided with two laterally spaced openings located at different levels and on opposite sides of a vertical plane passing through the optical axis of said objective, said range finder including a prism bar forming the mirror base of the range finder, said prism bar being mounted just outside the beam of light passing through said camera objective and its longitudinal axis forming an angle of less than 90° with respect to the said camera walls so as to position one end of said prism bar near said front wall in alinement with the higher one of said two openings and the other end at a greater distance behind said front wall in alinement with the lower opening, adjustable ray deflecting means mounted between said last named end of said prism bar and said front wall in axial alinement with said lower opening, and a view finder in said camera casing in axial alinement with said higher opening and mounted between the rear wall of said camera casing and the upper end of said prism bar, said view finder having an ocular lens through which said view finder and said range finder are observed.

4. In combination, a photographic camera having a camera casing provided with parallel front and rear walls and parallel top and bottom walls, a photographic objective on said front wall, a view finder, and a range finder of the mirror base type mounted within said camera casing, said front wall being provided with two laterally spaced openings positioned at different levels above the horizontal plane in which the axis of said camera objective is positioned, said view finder including an ocular lens mounted in the rear wall of the camera casing in axial alinement with one of said openings in said front wall, said range finder including a prism bar of predetermined length forming the mirror base of said range finder, said prism bar being mounted just outside the beam of light passing through said photographic objective and its longitudinal axis forming an angle of less than 90° with respect to the said camera walls so as to position one end of said bar directly behind that opening in the front wall which is associated with the view finder, while the other end of said prism bar is positioned at a distance behind said other opening, said range finder also including adjustable ray deflecting means mounted in axial alinement with said last named opening in the space between said front wall and said last mentioned end of said prism bar.

5. In combination, a photographic camera having a camera casing provided with parallel front and rear walls and parallel top and bottom walls, an adjustable photographic objective on said front wall, a view finder, and a range finder of the mirror base type mounted within said camera casing, said front wall being provided with two laterally spaced openings positioned at different levels, said view finder including an ocular lens mounted in the rear wall of the camera casing in axial alinement with one of said openings in said front wall, said range finder including a prism bar of predetermined length forming the mirror base of said range finder, said prism bar being mounted just outside the beam of light passing through said photographic objective and its longitudinal axis forming an angle of less than 90° with respect to the said camera walls so as to position one end of said bar directly behind that opening in the front wall which is associated with the view finder, while the other end of said prism bar is positioned at a distance behind said other opening, said range finder also including adjustable ray deflecting means mounted in axial alinement with said last named opening in the space between said front wall and said last mentioned end of said prism bar, and an operative connection between said adjustable camera objective and said adjustable ray deflecting means for adjusting the latter whenever said camera objective is adjusted.

6. In combination, a photographic camera having a camera casing provided with parallel front and rear walls and parallel top and bottom walls, a photographic objective on said front wall, a view finder, and a range finder of the mirror base type mounted within said camera casing, said front wall being provided with two laterally spaced openings positioned at different levels above the horizontal plane in which the axis of said camera objective is positioned, said view finder including an ocular lens mounted in the rear wall of the camera casing in axial alinement with the higher one of the openings in said front wall, said range finder including a prism bar of predetermined length forming the mirror base of said range finder, said prism bar being mounted just outside the beam of light passing through said photographic objective and its longitudinal axis forming an angle of less than 90° with respect to the said camera walls so as to position one end of said prism bar close to said front wall in axial alinement with the higher opening in the same, while the other end of said prism bar is positioned at a greater distance behind said front wall in axial alinement with the lower opening in the same, and adjustable ray deflecting means mounted in the space between said front wall and said last mentioned end of said prism bar, said view finder including also a finder lens mounted between said ocular lens and the higher positioned end of said prism bar.

HEINZ KÜPPENBENDER.